(12) United States Patent
Levenshteyn

(10) Patent No.: US 7,810,082 B2
(45) Date of Patent: Oct. 5, 2010

(54) SYSTEM AND METHOD FOR TRANSFORMING GENERIC SOFTWARE CODE INTO OPERATOR SPECIFIC CODE

(75) Inventor: Roman Levenshteyn, Aachen (DE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 1017 days.

(21) Appl. No.: 11/187,535

(22) Filed: Jul. 22, 2005

(65) Prior Publication Data

US 2007/0022409 A1    Jan. 25, 2007

(51) Int. Cl.
    G06F 9/45  (2006.01)
(52) U.S. Cl. .................. 717/141; 717/104; 709/225
(58) Field of Classification Search ............... 717/104, 717/141; 709/225
    See application file for complete search history.

(56) References Cited

U.S. PATENT DOCUMENTS

2005/0071806 A1 * 3/2005 Sreedhar ............... 717/104
2005/0091374 A1 * 4/2005 Ganesan et al. ......... 709/225
2005/0216885 A1 * 9/2005 Ireland .................. 717/108

FOREIGN PATENT DOCUMENTS

EP    1 074 911 A    2/2001
EP    1 087 292 A    3/2001

OTHER PUBLICATIONS

Gregor Kiczales, et al., An Overview of AspectJ, 2001, Springer-Verlag Berlin Heidelberg, J. Lindskov Knudsen (Ed.): ECOOP 2001, LNCS 2072, pp. 327-353, 2001.*

A theory of aspects, David Walker, Steve Zdancewic, Jay Ligatti, Aug. 2003, International Conference on Functional Programming, ACM, pp. 127-139.*

Laddad R: "I Want my AOP", Part 2 Learn AspectJ to Better Understand Aspect-Oriented Programming Java World, Web Pub., San Francisco, CA US, Mar. 1, 2002, pp. 1-12.

Ng P et al: "Aspect-Oriented Programming: Road to a Resilient Architecture" Internet Article, [On-line] Apr. 8, 1005, pp. 1-7.

Michalis Anastasopoulos et al: "An Evaluation of Aspect-Oriented Programming as a Product Line Implementation Technology" 8th International Conference on Software Reuse, Jul. 7, 2004, pp. 141-156.

* cited by examiner

Primary Examiner—Hyung S Sough
Assistant Examiner—Kimberly Jordan

(57) ABSTRACT

Disclosed are systems and methods to automatically transform generic software code into operator specific code. For instance, in one embodiment, there may be an engine for transforming generic software code into operator-specific software code, the engine comprising: a module for reading generic software code, wherein the generic software code includes at least one generic control indication; a processing module including: a module for extracting the at least one generic control indication from the generic software code; a module for determining at least one aspect from the generic control indication, wherein the at least one aspect corresponds to operator specific requirements, a module for determining an integration instruction, a module for inserting the generic control indication with the at least one aspect according to the integration instruction; and a module for generating operator-specific software code which includes the at least one aspect.

15 Claims, 7 Drawing Sheets

SYSTEM AND METHOD FOR TRANSFORMING GENERIC SOFTWARE CODE INTO OPERATOR SPECIFIC CODE

TECHNICAL FIELD

The invention relates in general to software compiling engines, and in particular to systems and methods for transforming generic software code into operator specific code.

BACKGROUND INFORMATION

Historically, most mobile services were offered and provided by mobile operators. However, this situation is changing. Today, a growing number of mobile services are being offered by third-party application providers. Furthermore, this trend is expected to grow in the future and is expected to allow for much faster development time and a broader array of services.

Third-party service applications usually reside on the third-party servers which are outside of the operator's network. However, through contractual arrangements, they typically utilize some mobile services and functionalities offered by the operator's network.

Since operator network requirements are different and vary from operator to operator, third-party application developers/providers must currently maintain different specific versions of the same application—one for each operator. Obviously, maintaining operator specific versions greatly increases the expense of developing and supporting such applications, because many versions should be developed and maintained.

Typical examples of the specific functionalities from the operator network could be: interfaces to some mobile services (messaging, location, broadcasting, voice calls), authentication mechanisms, billing and charging interfaces. Interfaces to the mobile services provided by the operators network are usually essential for the application. Consequently, the application provider/developer must be thoroughly familiar with the semantics of each operator because the entire functionality of the application may depend on the application interface requirements. Thus, it is difficult to provide a uniform cross-operator solution for multiple operators because each application has to interact with different operator networks using different application interfaces for the similar mobile services provided by operators. Standards can ease this burden, but standard setting involves a long and complicated process.

Functionalities like authentication mechanisms, billing and charging system may be considered "common support functions". They are usually not directly related to the mobile specifics of the application, but required for deployment of the services and for realization of business and security models. Usually these functionalities are somewhat orthogonal to the main functionality of a mobile application and are rather independent of the implementation of the core logic of the application.

Because the application interfaces and common support functions vary from operator to operator, the application provider/developer must maintain different versions of the application. Often the versions only differ in the interaction with the application interface and the "common support functions."

What is needed, therefore, are systems and methods which allow operators to develop one application using generic parameters. The generic parameters may then be converted to operator specific parameters or requirements.

SUMMARY

Disclosed are systems and methods to automatically transform generic software code into operator specific code. For instance, in one embodiment, there may be an engine for transforming generic software code into operator-specific software code, the engine comprising: a module for reading generic software code, wherein the generic software code includes at least one generic control indication; a processing module including: a module for extracting the at least one generic control indication from the generic software code; a module for determining a reference to at least one aspect from the generic control indication, wherein the at least one aspect corresponds to operator specific requirements, a module for determining an integration instruction, a module for inserting an implementation of the referenced aspect according to the integration instruction and according to the generic control indication; and a module for generating operator-specific software code which includes the at least one aspect.

In another embodiment, there may be a method for interpreting source type parameters used in a function call, the method comprising: reading a plurality of source parameters; determining an aspect from the plurality of source parameters; if at least one of the plurality of source parameters relate to the aspect, then selecting a subset of the plurality of source parameters that relate to the aspect as a set of target parameters; if none of the plurality of source parameters relate to the aspect, then converting at least one of source parameters to at least one parameter which relates to the aspect such that the at least one converted parameter is included in the set of target parameters, and using the set of target parameters to perform processes in the function call.

In yet another embodiment, there is presented the concept of "relaxation of parameters". In other words, the programmer provides a set of values for potential parameters. Some of those values may or may not be used. At some point before or during program execution, only the parameters required by the operator's application interface are picked from this set. If, on the other hand, the parameter types do not match, certain embodiments will try to convert the values of provided parameter types into values of required parameter types using converters. The appropriate parameter values are then selected and used in the function calls during the execution.

To separate the process of implementing the core of the application (e.g., the business logic) from the process of implementing the interfacing code toward different operator-specific functionalities, some embodiments of the present invention use Aspect-orientated Programming ("AOP"). Furthermore, in order to use AOP in large-scale telecom applications, certain embodiments also use new extensions and constructs to existing AOP methods and constructs.

The methods and systems described herein solve problems of an application interfacing with a plurality of incompatible systems in operator networks. The task of adaptation of the applications and services to those systems is removed from the application developers and is performed in an automatic fashion. This automation makes development much easier and the development process much faster. The automation also eliminates the need for development and maintenance of different operator specific versions of the same third-party application.

Certain embodiments allow the program application to be "completed" at the run-time, deployment time, or launch time, which makes it possible to change the underlying interfaces without changing the application program. Other embodiments allow an operator to upgrade or even change its services exposed to the third parties without requiring the third parties to modify and reprogram their existing applications. In order to implement the new versions, the operators will just have to restart the new application. Thus, in certain embodiments, this allows for instant update of applications without a time-period for their adaptation to new operator interfaces. The end-user interfaces can still use the same application. In some instances, operators will not be forced to be standard compliant and may chose to use their own proprietary interfaces.

Another benefit of some embodiments is the support of the different business models for operator specific functionalities (e.g. different authentication or charging models for the same application). In certain embodiments, the application itself just marks the places where a corresponding action related to the given model should take place, but the "real" code implementing the action according to the specifics of operator will be inserted at execution/deployment time.

These and other features, and advantages, will be more clearly understood from the following detailed description taken in conjunction with the accompanying drawings. It is important to note the drawings are not intended to represent the only aspect of the invention.

DETAILED DESCRIPTION

Figure 1:
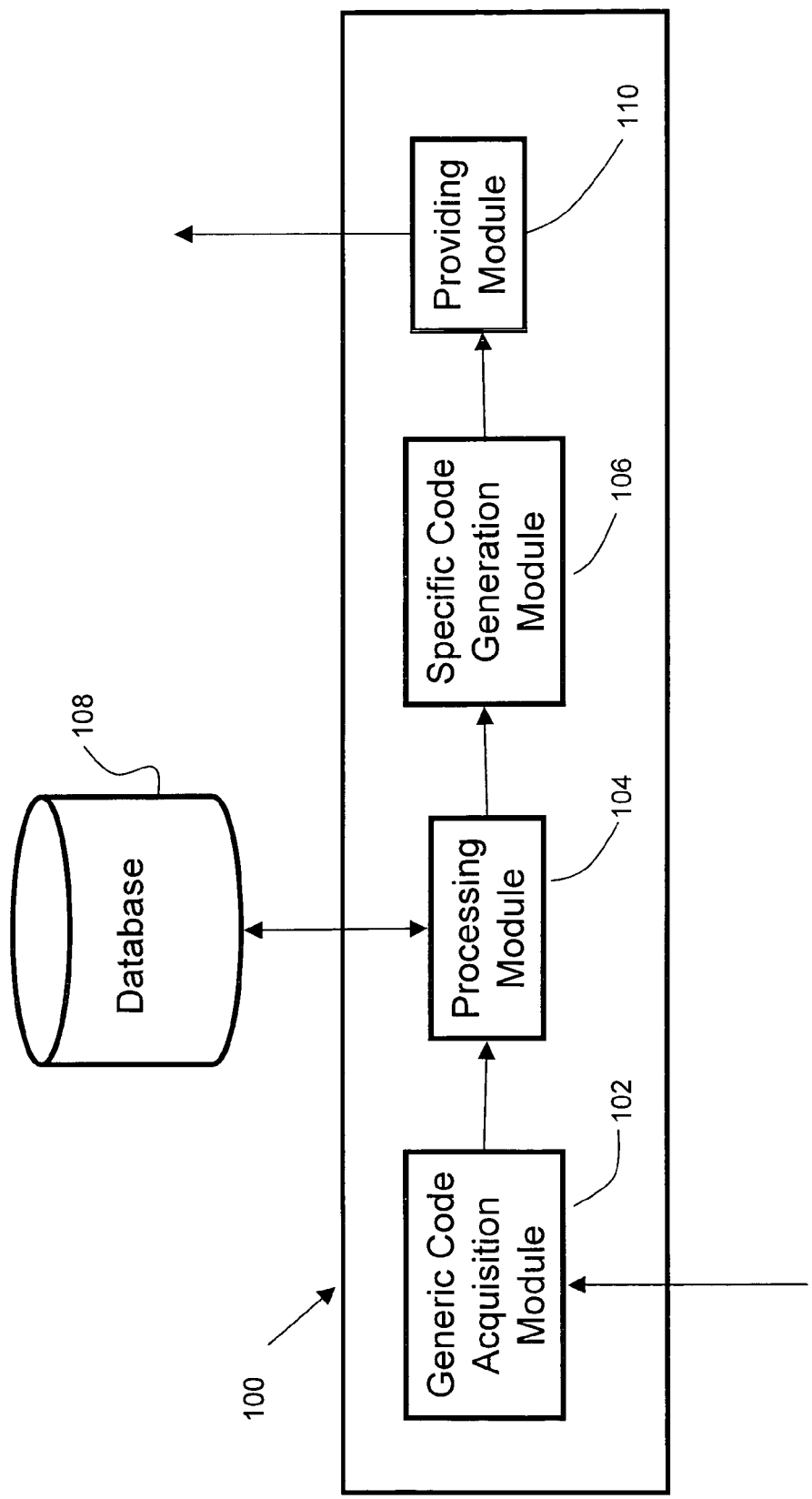
FIG. 1. is a conceptual view illustrating one embodiment of a pre-compiler software engine which incorporates one or more aspects of the present invention.

For the purposes of promoting an understanding of the principles of the present inventions, reference will now be made to the embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the inventions as described herein are contemplated as would normally occur to one skilled in the art to which the invention relates.

Aspect orientated Programming:

As discussed above, certain embodiments of the present invention use Aspect-orientated programming ("AOP"). AOP is a relatively new programming technology. The programming paradigm of AOP centers on constructs called aspects, which treat concerns of a separate set of objects, classes, or functions. An AOP program has principled points (e.g. "join points") where programmers can identify and modify the program semantics. In AOP, programmers use a language-feature called a "pointcut" to specify sets of join points, and "advice" (code like methods or functions) to specify the behavior to join at those points. Together, these features enable aspects to implement behavior for concerns that crosscut the core concern of the application. Thus, AOP is a way of modularizing crosscutting concerns much like object-oriented programming is a way of modularizing common concerns.

Typically, AOP methods are used in applications for implementation of logging, persistence, caching and some kinds of debugging. Usually, aspects are totally independent of the applications where they will be applied. In other words, the join points (or control comments) are used just to mark the places for aspect application and eventually for providing the strictly typed parameters required by the aspects.

For instance, a telecommunications application might have a core concern of routing calls. However, a secondary or "cross-cutting" concern deals with timing and billing those calls. The timing and billing concerns could crosscut the whole object hierarchy. Aspect-oriented programming allows for a separation of crosscutting concerns from the core concerns. AOP methods move code not related to solving the core concerns from the business logic into a separate module. The application code, therefore, no longer contains pieces of crosscutting concerns scattered across module. Instead, programmers can maintain crosscutting concerns in aspects. Thus, both core and crosscutting concerns are easier to code and maintain.

Typically, AOP involves three distinct development steps:

1. Aspectual decomposition: The requirements are analyzed and decomposed to identify crosscutting and common concerns. Module-level concerns are separated from cross-cutting system-level concerns. For example, in a credit card module example, three concerns may be identified: core credit card processing, logging, and authentication.

2. Concern implementation: Each concern is implemented separately. For the credit card processing example, code for the core credit card processing unit, logging unit, and authentication unit would be written separately.

3. Aspectual recomposition: An aspect integrator generates the recomposition rules by creating modularization units called "aspects." The recomposition process, (also known as weaving or integrating), uses this information to compose the final system. For the credit card processing example, a programmer would specify in a language provided by the AOP implementation, that each operation's start and completion must be logged. A programmer would also specify that each operation must clear authentication before it proceeds to the business logic modules.

In summary:

1. The designer defines and separates the concerns, core and crosscutting.
2. The developer writes independent modules to implement them.
3. The AOP system combines/integrates the modules. (AOP calls this process "weaving" and the component that executes this process is called "weaver"). The weaver, a processor, assembles an individual concern in a process known as weaving. The weaver, in other words, interlaces different execution-logic fragments according to a supplied criteria or "integration description."

An AOP implementation can implement the weaver in various ways, including source-to-source or binary-to-binary translation. For source-to-source translation, the weaver takes preprocess source code for individual aspects to produce weaved source code. The AOP compiler then feeds this converted code to the base language compiler to produce final executable code. For instance, using this approach, a Java-based AOP implementation would convert individual aspects first into Java source code, then the Java compiler would convert the Java source code into byte code. For binary-to-binary translation, the AOP system converts binary (i.e.

already compiled programs, where source code is not available at the moment) applications into transformed binary applications.

As previously discussed, the use of AOP techniques allows for the implementation of the crosscutting features in a much easier and cleaner fashion. Furthermore, AOP methods can be applied statically (i.e. before the application is deployed) or dynamically (i.e. at the run-time) which allows for run-time "transformation" of the programs.

For example, consider the situation of an authentication process that occurs at some point during the execution of a mobile application. Different operators can use different authentication mechanisms (e.g. Liberty Alliance based authentication, Kerberos based authentication, authentication based on the MSISDN number of the client). Without the AOP approach the typical code of the application that uses Liberty Authentication might look like:

OperatorSpecificLibertyCredential cred;
Call_Liberty_authentication(cred)
Call_operator_authorization(cred)
Normal_business_logic()

Similarly, without the AOP approach the typical code of the application that uses Kerberos authentication might be similar to:

OperatorSpecificKerberosCredential cred;
Call_Kerberos_authentication(cred);
Call_operator_authorization(cred);
Normal_business_logic()

Note that for these example selections of code, a Java-like syntax is used for illustration purposes. However, these examples are not meant to limit the disclosed embodiments to any specific AOP implementation or language.

As one can see, the above code is dependent on the type of the authentication. Depending on the authentication type, the source code should contain specific function calls using specific parameters. For supporting different types of authentication, several code fragments like the one given above will have to be inserted into the source code of the application or different versions of the same application would have to be developed.

Using AOP methods, on the other hand, the code could be similar to:

```
/*
  @Authentication
  {
    // Parameters of the aspect
    credential=Credential(...),
  }
*/
```

The operator-specific aspect implementations could be similar to:

```
aspect LibertyAuthentication (Credential credential)
{
  ...
}
aspect KerberosAuthentication (Credential credential)
{
  ...
}
aspect MsisdnAuthentication (Credential credential)
{
  ...
}
```

An integration description could look like:
"apply LibertyAuthentication at all join points referring to the Authentication"

With the integration description given above, the LibertyAuthentication aspect will be applied at the join point declared in the client.

Thus, using AOP techniques, the authentication call is not part of the code, but a part of control comment. If an operator does not use Authentication at all, then no aspect will be applied for this join point. Additionally, note that one control comment supports all possible types of authentication. So, there is no need to change the source code of the application if a new authentication method is to be used.

In the above example, the type of the Authentication aspect's parameter is Credential. Note that this parameter exactly matches the type of the parameters used by the implementation of aspects. Normally, an aspect in AOP, if it has parameters of the given types T1, . . . , Tn, would require all of them (or their subset) to be able to instrument the program/application. At every marked place inside the application, where a given aspect should be applied, the programmer has to provide these parameters and these parameters should exactly match the types of expected aspect's parameters.

In other words, AOP methods use "strong type" control for the parameters of the aspects. As a consequence, the developer who wants to use a given aspect should know exactly the types of its parameters. While this information is available for in-house developed aspects or for some standardized aspects, it might not be unavailable in more complex scenarios (e.g., deployments in the mobile networks of different operators because each operator can implement an aspect with some special parameters that are different from the implementations of the same aspect by other operators). In many cases the application developer can only guess about what kind of parameter an aspect may require, because it may not known in advance what aspects will be applied during the deployment and execution of the application.

In some situations, the need for a functionality of an aspect can span over many different places inside the application. This is particularly true in a situation requiring a complex business logic consisting of several logical steps. For example, the authentication process is usually orthogonal to the core business logic of the application and hence is a good candidate for the AOP aspect. On the other hand, the authentication process is complex and consists of several steps like login, authorization for a given action and logout. These steps may be spread over the application. But all these steps logically still belong to the same authentication aspect. Until now, modern AOP methods did not provide a clear mechanism to-handle this situation.

Aspects:

Each operator is obviously familiar his own infrastructure and application interfaces. So, in some embodiments of the present invention, the operator will be responsible for producing a code which interfaces with its nodes and network using the proper protocols. In certain embodiments, the interfacing code may be provided in form of aspects. As previously discussed, an "aspect," may be a network operator software module that corresponds to a control command. Furthermore, there may exists a one-to-many relation between a control command (e.g for authentication) and network operator specific aspects implementations (e.g. aspect1 for authentication to NWO1, aspect2 for authentication to NWO2 etc.) Consequently, this code can then be inserted or "plugged in" into the application programs automatically by means of an AOP engine or other AOP methods.

For example, the aspects provided by the operator may describe how to interface to a system in the operator's network. This description can use proprietary and operator specific protocols. However, the description does not need to address the semantics of the third-party application.

In addition to aspects, descriptions of the integration process can be provided by different parties, such as the developer of the application, by the service provider that deploys a given application on its servers or by a party providing implementation of given aspects, such as an operator. In certain embodiments, these descriptions may be in form of the configuration files. Such descriptions or configuration files may be used by an AOP Engine or weaver to decide where different aspects should be applied.

Control Comments:

Some embodiments of the present invention introduce the concept of the related "control comments" which can be used to mark the steps of the complex business logic implemented by means of some aspects.

In the following text explaining the invention, a terms "control indicators" or "control comment" will be used. These terms may refer to a variety of methods for marking the places where aspects should be applied in the code. As will be explained later, such control indicators could include related control comments, relaxed parameters, sub-aspects or configuration file indicators.

Turning now to FIG. 1, there is a software pre-compiler engine 100 which may implement certain embodiments of the present invention. In the illustrated embodiment, the pre-compiler engine 100 comprises a generic code acquisition module 102, a processing module 104, a specific code generation module 106, and a providing module 110. In certain embodiments, the pre-compiler engine 100 may also be in communication with a database or library 108.

In certain embodiments, the generic code acquisition module 102 reads a file containing generic software code, e.g. remotely from a server or from a data carrier inserted into the generic code acquisition module 102. The generic software code contains control indicators. As discussed above, the control indicators may be AOP indicators, "control comments" or contain relaxed parameters. Thus, the control indicators may be used as "place holders" for invocation/calls of operator specific purposes and functions (billing, authentication etc.) The data streams acquired by the generic code acquisition module 102 are then passed to the processing module 104, which identifies the control indicators and determines the appropriate specific control codes for the particular operator under consideration.

In this illustrative example, the engine 100 may be an AOP engine, so that the processing module 104 uses operator specific aspects implementations which may be contained in the database 108 that correspond to the "control indicators" in the code. In determining the specific control codes, the processing module 104 accesses the database 108, which contains operator specific libraries of aspects and application interface protocols.

Figure 2:
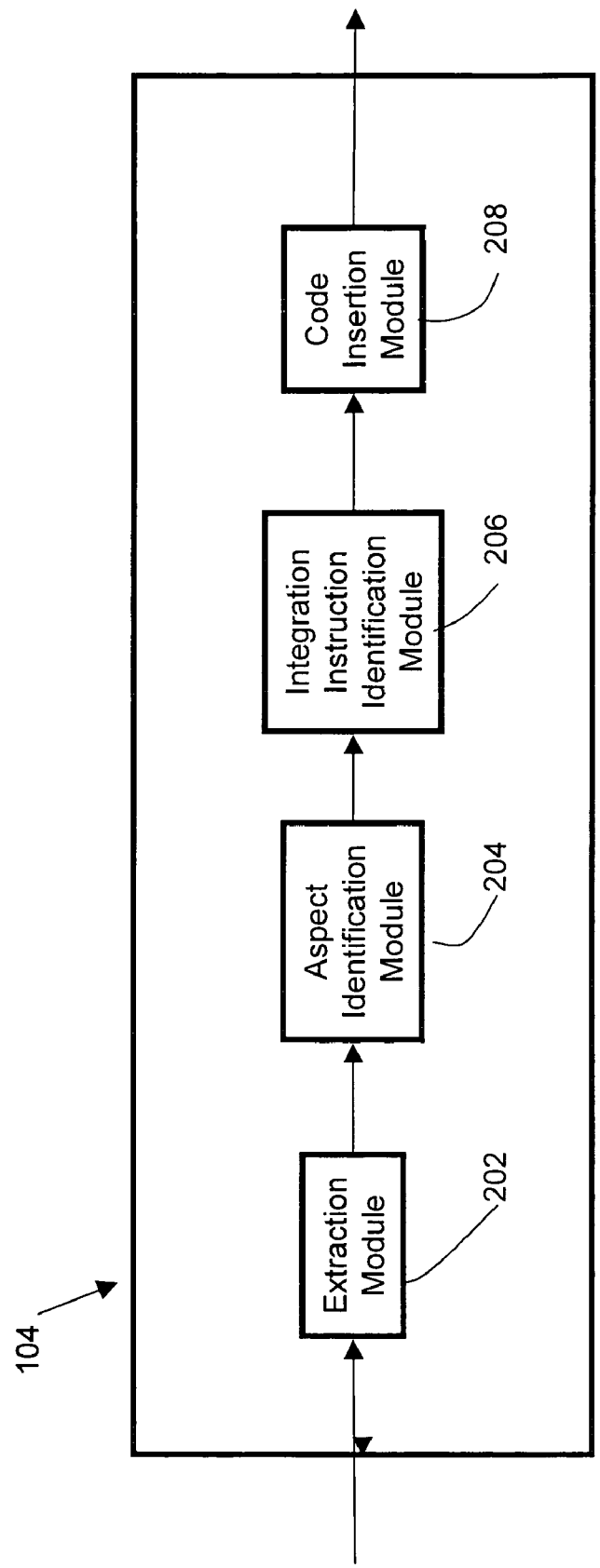
FIG. 2 is a conceptual view of one module of the pre-compiler software engine of FIG. 1.

FIG. 2 is a detailed illustration of one such embodiment of the processing module 104. As illustrated, there is an extraction module 202 which identifies and extracts the generic control indicators from the other programming code. The extracted control indicators are then sent to an aspect identification module 204. The aspect identification module identifies an operator specific aspect that corresponds to the generic control indicator. In certain embodiments, there may also be an integration instruction identification module 206. The integration instruction identification module 206 identifies specific instructions which govern the placement of the operator specific aspects implementations into the code. In certain embodiments, both the aspect identification module 204 and the integration instruction identification module 206 accesses one or more tables or databases 108, which contains operator specific aspects implementations and integration instructions.

In certain embodiments, a code insertion module 208 uses the integration instructions to determine where in the final program the network operator specific program code should be placed. The code insertion module 208 then inserts operator specific code at the appropriate location in the code.

Turning back to FIG. 1, in some embodiments, there may be a specific code generation module 106. which produces "binary-to-binary" code, where the AOP system converts binary (e.g. already compiled program code, where source code is not available at the moment) applications into transformed binary applications. Alternatively, the specific code generation module 106 could produce a source code file containing the specific program code. The source code file may then be complied in a conventional manner.

The providing module 110 is adapted to provide the operator-specific software code generated by the processing module 102 and, optionally, by the specific code generation module 106 such that the operator-specific software code can be accessed for execution. The providing module 110 may be a data storage from which the operator-specific software code may be downloaded for execution, or may be an output unit adapted to transfer the operator-specific software code to a data carrier, or the providing module 110 may comprise a transmission unit adapted to send the operator-specific software code via one or more messages to an execution environment suitable for executing the operator-specific software code, e.g. providing module 108 may send the operator-specific software code to a processor which will execute the operator-specific software code.

Figure 3:
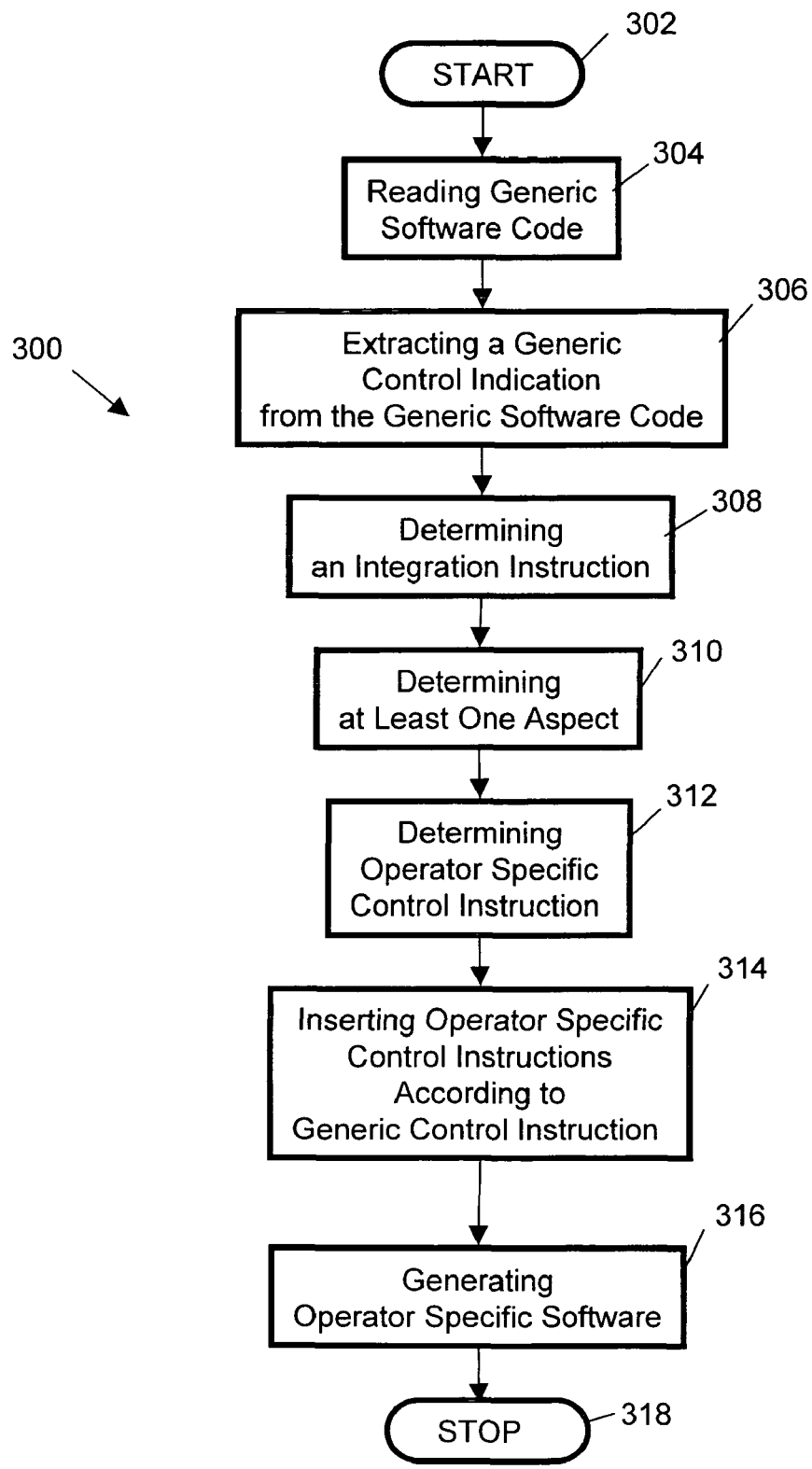
FIG. 3 is a flowchart illustrating a exemplary process which incorporates one or more aspects of the present invention.

An exemplary method or process 300 which could be used by the software transformation engine 100 is illustrated in FIG. 3. The process begins at step 302 and flows to step 304 where a stream of generic software code (either source code or binary code) is read. As discussed previously, the generic software code contains generic control indicators. In step 306, the generic control indicators are identified and extracted from the generic software code. In step 308, integration instructions corresponding are also identified. In step 310, the aspects corresponding to the generic control indicator are identified.

In step 312, operator-specific control implementations are identified by accessing an appropriate database. As discussed previously, for any control indicator, a set of required aspects and integration descriptions may then be used by an AOP engine which applies the aspects to the application being deployed. In step 314, operator-specific control implementations may then be inserted in the code according to the generic control instructions. Corresponding insertion places within the code are located according to requirements located in the integration descriptions. Once the operator-specific control implementations are in place, the new code may be written to a file (step 316) which, if the file contains source code, may then be complied or executed in a conventional manner. The process ends at step 318.

In sum, to solve the problem of developing and maintaining different operator-specific versions of the same application, certain embodiments of the present invention use the AOP methods. Thus, instead of implementing all network operator specific code into program code, the programmer uses generic control indicators (e.g., AOP annotations-like "control comments") as a place holder for invocation/calls of operator specific purposes and functionalities like charging, authentication etc. The business logic of the application supplemented with the control indicators is then fed into an Aspect-Oriented-Programming (AOP) Engine that generates network specific program code containing the business logic code and network operator specific code.

Relaxed Parameters:

As previously discussed, the generic control indicators may take many forms. In certain embodiments, the generic control indicators may contain "relaxed parameters." Relaxed parameter passing may provide a very flexible alternative to the strong type control of aspect's arguments which is currently used by AOP methods.

Relaxed parameter passing puts additional information into the join point definitions/control commentaries and allows for "relaxation" of parameter descriptions. With relaxed parameters, the types of provided parameters are not required to match exactly the types expected by the aspects. Also the number of expected and provided parameters may be different. If the parameters do not match, AOP system selects an appropriate converter module to convert the provided parameter type into the required type for the aspect under consideration.

In order to fully support the concept of relaxed parameters, the semantic (and syntax) of join points (currently used in AOP techniques) should be extended. The functionality of the weaver may also be also extended to support conversions between types during the application/weaving aspects.

Relaxed parameters allow for weaker restrictions on the types and set of required parameters. Parameters will still be typed, but not strictly typed. At the places in the code where the aspects should be applied (i.e. at join points), the programmer would provide the set of values descriptions for possible arguments in industry accepted formats (e.g. using well-known data types). While providing these descriptions, the programmer may make a choice of parameters and their types based on his understanding of industry conventions.

Later, the AOP weaver will analyze the provided parameters and select only a subset that is relevant for a given aspect. If the types of the selected provided parameters do not exactly match the required types of parameters, in certain embodiments, the weaver will try to convert them into the appropriate type (e.g. conversion of widely accepted type into an aspect specific type).

To make such the conversion easier, the weaver may contain a database or library of converters for widely accepted types into specific types. Consequently, when the weaver is required to convert a parameter type, the weaver would simply use a matching conversion or a chain of such conversions, so that the weaver converts the value of original (widely accepted) type provided in the description of join point into a value of specific type required by the specific aspect implementation. For instance, in certain embodiments, the database could contain columns such as SourceType, TargetType, and a conversion function (see Table 1). In other words, if there is a conversion function that maps values of type X to values of type Y then there is a corresponding row in the database and by going a "select ConversionFunction whereSourceType='X' and TargetType='Y'" (SQL-like syntax is used for this example), the process may determine if there is a conversion available and obtain a corresponding function (or a reference where to find such a function). This function may then be executed to convert the values of type X into values of type Y. In certain embodiments, the use of converters may be also applied to the return values of the aspect calls. A converter may transform a return value from an operator specific data type into a value of a data type specified in the join point description.

TABLE 1

| SourceType | TargetType | ConversionFunction |
|---|---|---|
| X | Y | ConvertXtoY |

In certain embodiments, the functionality of the AOP systems could be extended to contain a set of currently available type converters or functions. Such functions can be built-in into the system and/or defined by the administrator of the AOP system. The type converters can then be considered to be a function that takes an argument of one type (the source type) and returns the value of another type (target type). The produced value of the target type may then be considered to be the representation of the argument value using the target type.

Certain parameters are "positional." In other words, parameters are not named and only their values and types are provided. Their semantic is dependent on their position within the parameter list. (for example, a first parameter may be an integer which represents a time value in seconds, a second parameter may be a string, which passes the name of a person.) This type of parameter passing is widely used in the industry and used by most programming languages. The syntax is usually:

(value for parameter 1, value for parameter2, . . . , value for parameterN)

The usage of the relaxed parameters may require an extension of the semantics and new syntax (see below). Basically, relaxed parameters may allow for multiple alternatives for parameter value of a given parameter.

One suggested new syntax may be:

(list of possible values for parameter 1, list of possible values for parameter2, . . . , list of possible values for parameterN)

One skilled in the art would recognize that with such a syntax, at each position multiple alternative values (and their types) can be specified.

In the situation where positional parameters are used, the relevance to the aspect can be based on the types. In other words, if the aspect requires a parameter of a given type at a given position in the parameter list and the plurality of source parameters contains a value for a parameter of the given type at the given position, then this value of the parameter is relevant. Of course, this only works if there is at most one source parameter of such a type at a given position. If there is more parameters of the same type at same position, there is no way to distinguish and select one of them.

An alternative possibility is the use of named parameters. In this situation, the required parameters are described using not only types, but also names. The source parameters do have names as well. Thus, it is apparent which of the source parameters relates to the required parameter. In fact, in this situation, the relevance can be based only on the names.

For each target parameter, there may be a set of related source parameters with the same name, but values of different types. If one of these types matches the type of required parameter, then the corresponding source parameter value is selected as a real parameter that will be used for the application of the aspect. On the other hand, if none of the types matches, then the process looks for a conversion function chain that can convert one of these types into the required type.

Figure 4:
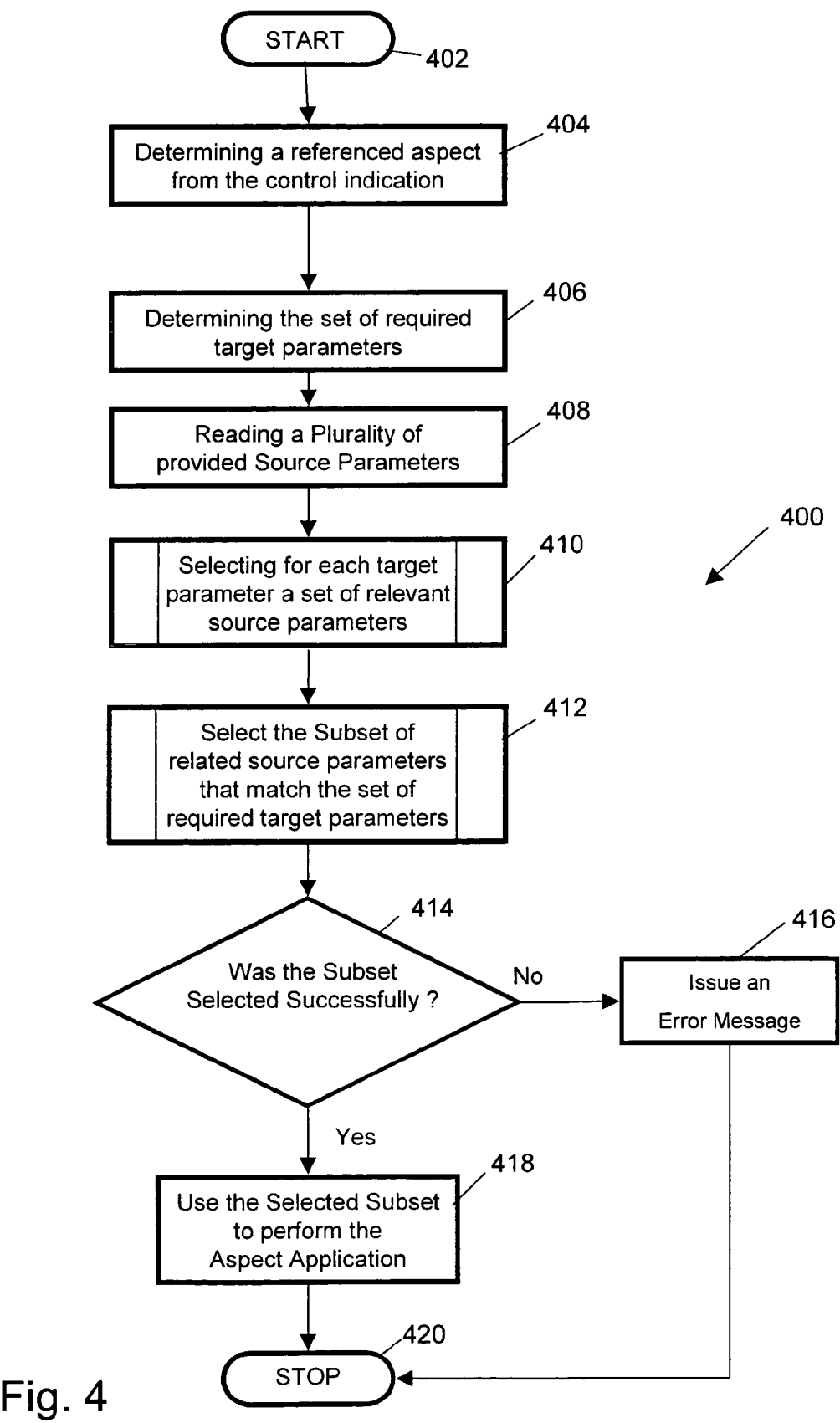
FIG. 4 is a flowchart illustrating a exemplary process which incorporates one or more aspects of the present invention.

A method 400 showing one embodiment of relaxed parameter processing is illustrated in FIG. 4. The process starts at step 402 and continues onto step 404. In step 404, a referenced aspect implementation/function is determined from the aspect invocation/function call. In step 406, a set of required target parameters (including e.g. their types, names, positions) is determined from the provided operator specific control implementations. In step 408, a plurality of source parameters is read from the control indication containing an aspect reference with relaxed parameters. In step 410, a subprocess may be invoked which selects, for each target parameter, a set of relevant source parameters from the aspect invocation/function call for the target parameter. For positional parameters, the set of source parameters will be at a position required by target parameter. On the other hand, for named parameters, a set of source parameters with a name of a given target parameter will be provided.

At step 412, another subprocess may be invoked to select a subset of related source parameters that correspond to the set of required target parameters. In other words, for each target parameter, one of the related source parameters from the set of related source parameters is selected so that the type of the target parameter and the type of the selected source parameter are the same.

At step 414, the process determines if the subset of related source parameters was successfully selected. If not, an error message is issued in step 416, and the process moves to completion at step 420. On the other hand, if the subset of related source parameters is successfully selected, the process flows to step 418.

In step 418, the selected subset of parameters is then defined to be the subset which may then be used to perform the aspect application. The selected parameters are then used to perform a aspect application or continue with processing in a conventional manner. At step 420, the process terminates.

Figure 5:
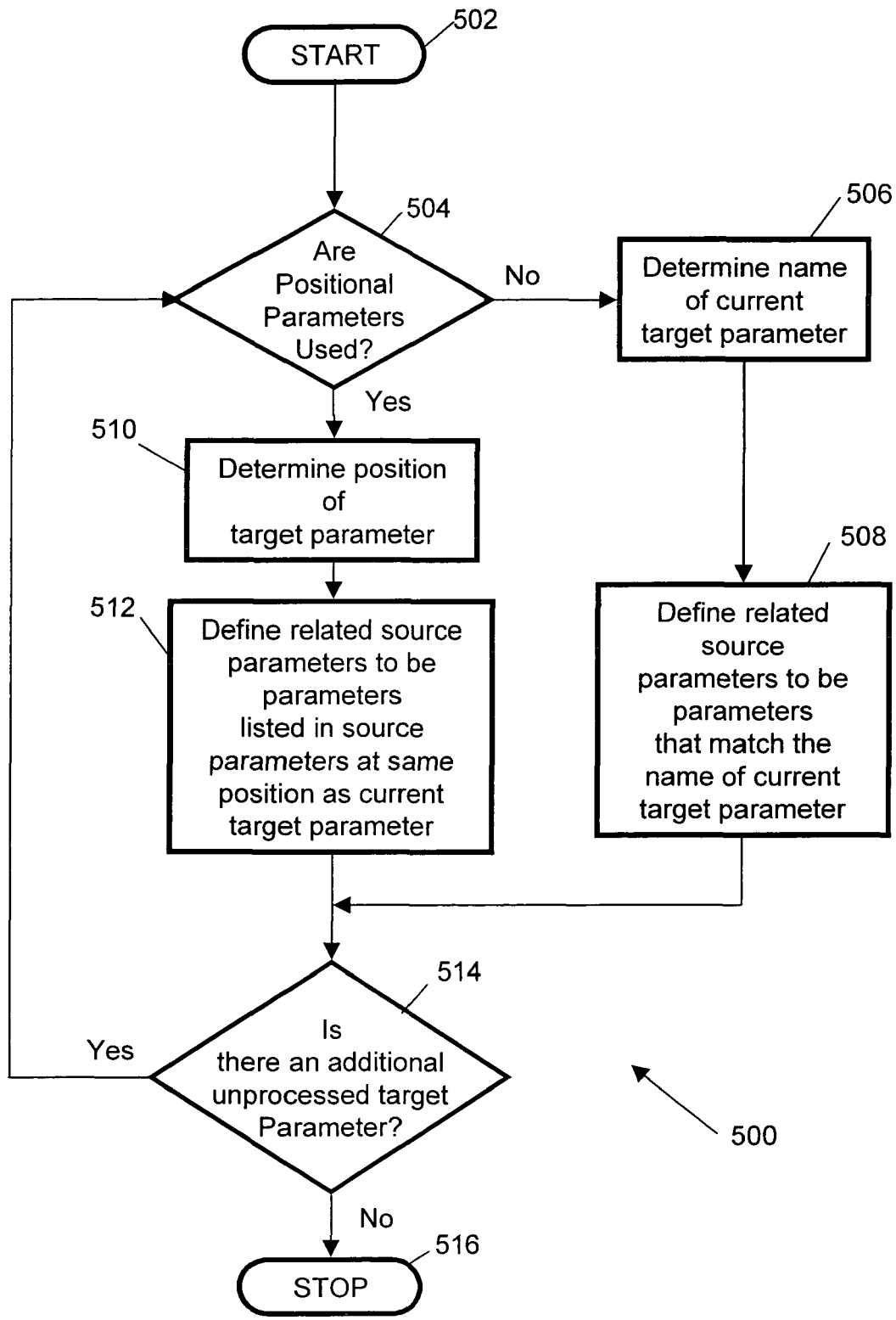
FIG. 5 is a flowchart illustrating one embodiment of a subprocess, which may be used by the process illustrated in FIG. 4.

FIG. 5 illustrates one embodiment of a subprocess 500 which may be invoked at step 410 of FIG. 4. Turning to FIG. 5, the process starts at step 502 and continues onto step 504. In step 504, the process determines if positional parameters are used by the aspect implementation and by the aspect reference. If not, the process flows to step 506. On the other hand, if positional parameters are used, the process flows to step 510.

At step 510, the process determines the position of the current target parameter in the signature of the respective aspect implementation/function declaration. At step 512, a set of related source parameters for the current target parameter is defined to comprise the parameters that are listed in the source parameters plurality at the same position as that of the current target parameter. The process then flows to step 514.

Turning back to step 504, as previously discussed, if positional parameters are not used, the process flows to step 506, where the name of the current target parameter is determined from the signature of the respective aspect implementation/function declaration. In step 508, the set of related source parameters for the current target parameter may then be defined to be the source parameters that have the same (or more generally, a matching) name the current target parameter. The process then flows to step 514. At step 514, the process determines whether there are any additional target parameters which have not been processed. If yes, then the process flows back to step 504. If there are no additional target parameters, the process flows to step 516, which ends the subprocess.

Figure 6:
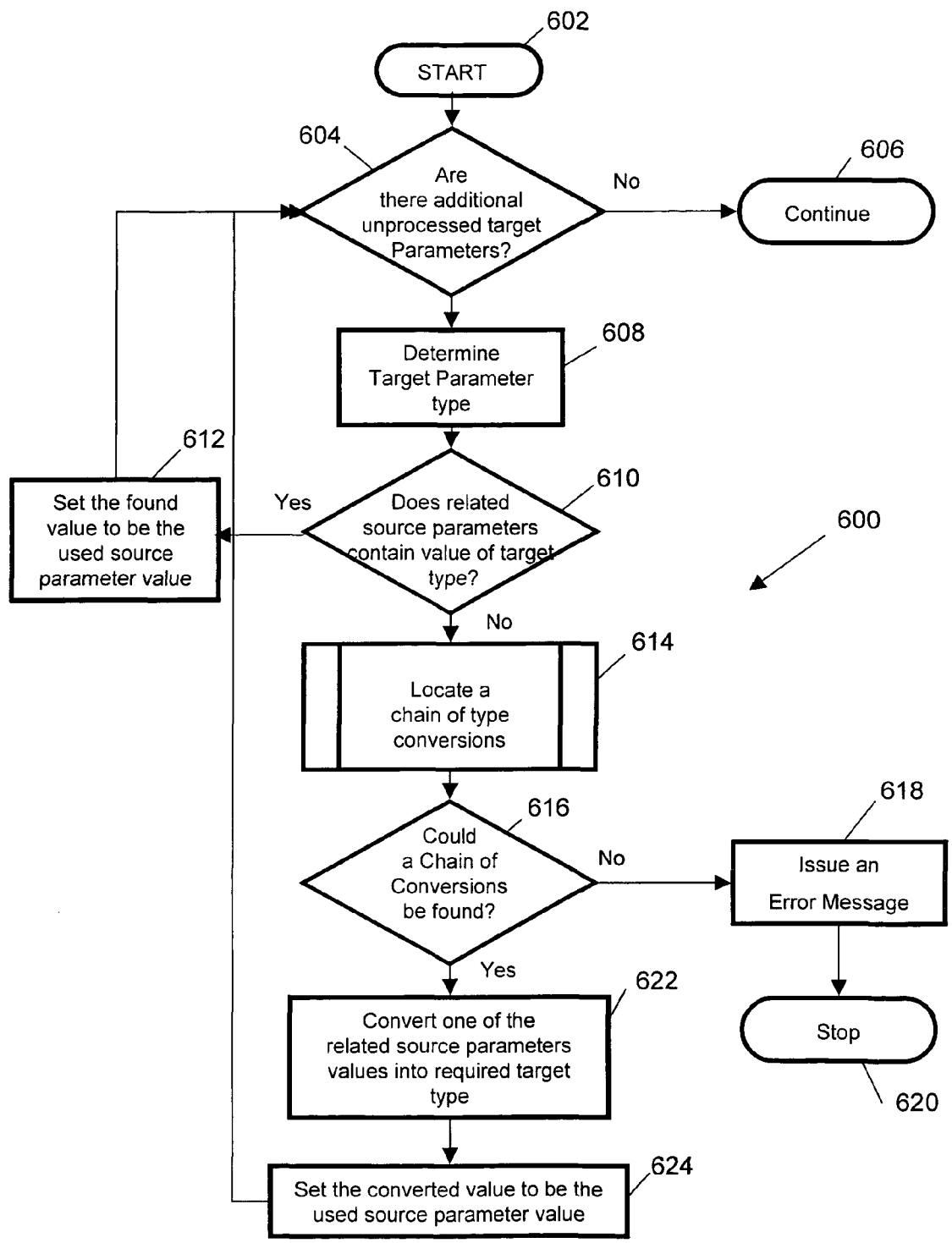
FIG. 6 is a flowchart illustrating one embodiment of another subprocess, which may be used by the process illustrated in FIG. 4.

FIG. 6 illustrates one embodiment of a subprocess 600 which may be invoked at step 412 of FIG. 4. Turning to FIG. 6, the process starts at step 602 and continues onto step 604. In step 604, the process determines if there is another not yet processed target parameter, if not, the subprocess flows to step 606, where it terminates. On the other hand, if there are unprocessed target parameters, the process, flows to step 608 which begins the processing of the next target parameter.

At step 608, the process determine the required type of the current target parameter from the description/declaration of this target parameter in the aspect/function specification. At step 610, the process determines if the set of related source parameters contains a value of the required target parameter type. If yes, then the process flows to step 612. If no, the process flows to step 614. At step 612, the process defines the found value to be the related source parameter to be used for the current target parameter in the aspect application/function call. The process then flows back to step 604.

At step 610, if the process determines that there is no value of the required target type among the related source parameters, the process flows to step 614. At step 614, a subprocess is invoked for locating or searching a chain of conversions to find the chain of type conversions. In step 616, the process determines if a chain of type conversions was located. If no chain of type conversions is found, then the process flows to step 618, where an error message is issued. The process then stops at step 620.

On the other hand, if at step 616, the process determines that a chain of type conversions has been located, the process flows to step 622. At step 622, the corresponding related source parameter value is converted into the value of required target parameter type using the found chain of conversions. (This conversion can be performed on the value e.g. during the aspect weaving time or at the moment of the real aspect/function invocation during the run-time).

At step 624, the related source parameter to be used for the current target parameter in the aspect application/function call is then defined to be the converted value. The process then flows back to step 604.

Figure 7:
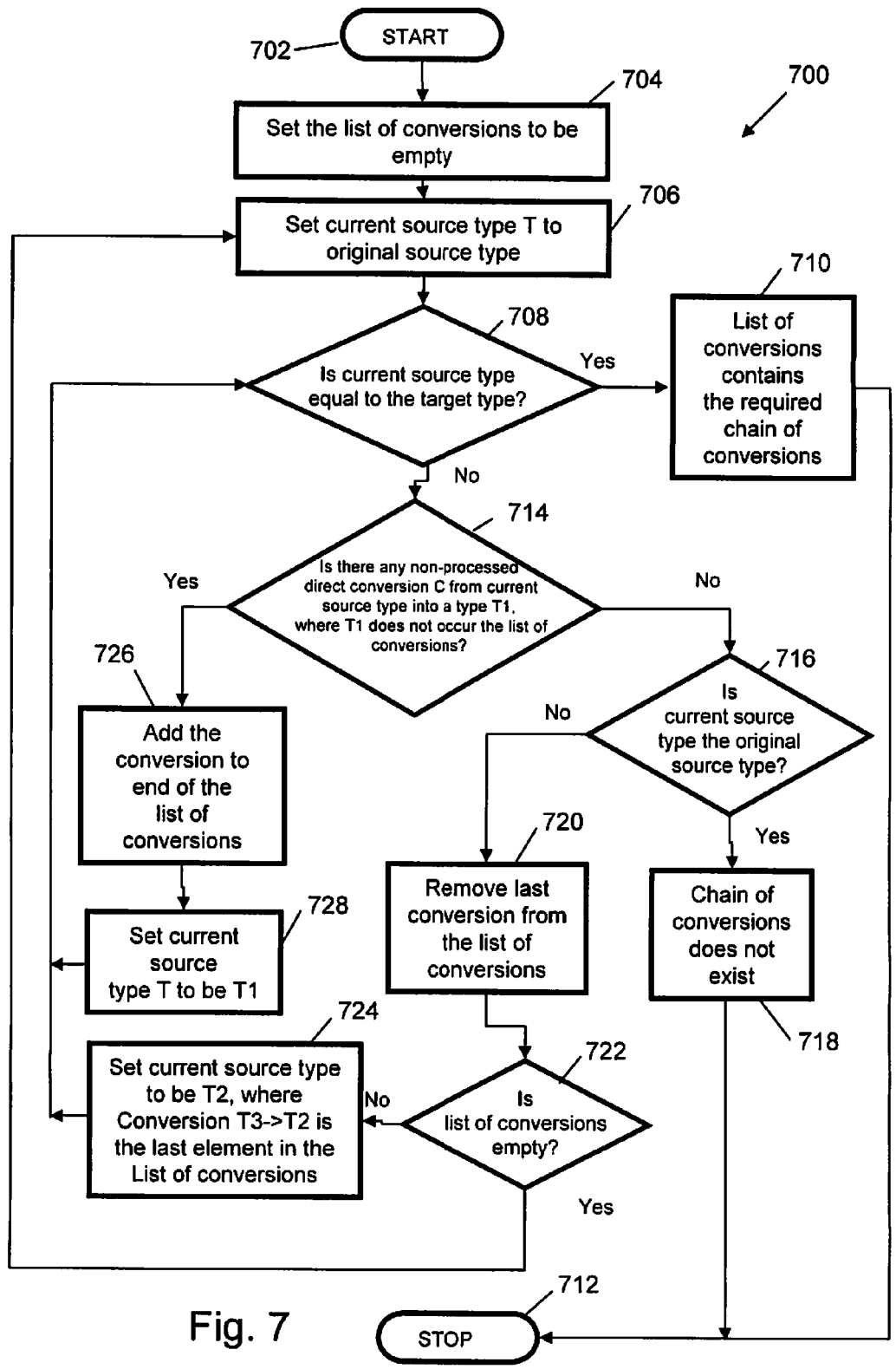
FIG. 7 is a flowchart illustrating one embodiment of a subprocess, which may be used by the process illustrated in FIG. 6.

FIG. 7 illustrates one embodiment of a subprocess 700 which may be invoked at step 614 of FIG. 6. The subprocess for searching the chain of conversions is one of many possible embodiments. In this particular embodiment, the subprocess starts with the source type and builds a chain of one-step conversions, so that it terminates with conversion into a required target type. Another approach could be to start with the target type and proceed in the opposite direction.

This subprocess assumes that the input variables are: X1—source type, and X2, the target type. The output of the process is a description of a chain of conversions that converts values of type X1 into values of type X2. Additional variables may be: L—list of conversions, and T—current source type. The process starts at step 702 and continues onto step 704. In step 704, the list of conversions "L" is set to be empty. In step 706, the current source type T is set to be X1, i.e. initial source type. In step 708, the process determines whether the current source type is equal to the target type. If yes, then the process flows to step 710, where the list of conversions "L" is defined to contain the required chain of conversions. This list is then passed to the process 600 when the process 700 stops in step 712.

On the other hand, if in step 708, the process determines that the current source type is not equal to the target type, the process flows to step 714. At step 714, the process determines whether there is any non-processed direct conversion from current source type into a type T1, where T1 does not occur on the list of conversions. If yes, then the process flows to step 726. On the other hand, if not, then the process flows to step 716. At step 716, the process determines whether the current source type is the original source type. If yes, then the process flows to step 718, where a flag is set indicating that the chain of conversions does not exist. The process then flows to step 712 where the subprocess terminates. On the other hand, at step 716, if the process determines that the current source type is not the original source type, the process flows to step 720. At step 720, the last conversion is removed from the list of conversions. At step 722, the process determines whether the list of conversions is empty. If yes, then the process flows to step 706. If not, process flows to step 724. At step 724, the current source type is set to T2, where the conversion T3->T2 is the last element in the list of conversions ("L"). The process then flows to step 708.

Turning back to step 714, where the process determines whether there is any non-processed direct conversion from current source type into a type T1, where T1 does not occur on the list of conversions? If yes, then the process flows to step726. At step 726, the conversion is added to the end of the list of conversions. At step 728, the current source type "T" is set to be type T1. The process then flows to step 708 where it is determined whether the current source type is equal to the target type as discussed previously.

The process 700 always terminates at step 712 because: (a) There is a finite number of existing types; (b) there is a finite type of existing conversions; (c) the process 700 is designed so that each type known to the system can occur only once in the list of conversions. Therefore, the length of the conversion chain is also finite. A lengthy iteration would require the enumeration of all possible chains starting from X1. However, the number of such chains is also finite, because the maximal length and the number of alternatives for each element of the chain are finite.

An application of AOP may be used to illustrate the code which could be implemented using "relaxed parameters." For this discussion, the same example discussed above will be used. Thus, the AOP implementation can be simplified and the code might be similar to:

```
/*
    @Authenticattion
    {
        // Parameters of the aspect
        // Different possible forms of the credential parameter
            cred="cred",
            cred=MSISDN("+49123456789"),
            cred=KerberosTicket(...)
            pad = OneTimePad(...)
    }
*/
```

And the operator-specific aspect implementations would look like:

```
aspect LibertyAuthentication (LibertyCredential cred)
{
    ...
}
aspect KerberosAuthentication (KerberosTicket cred, OneTimePad pad)
{
    ...
}
aspect MsisdnAuthentication (MSISDN cred)
{
    ...
}
```

The available set of type converter could be:
MSISDN->SSO_Credential
SSO_Credential->LibertyCredential
Because it may not known at the time of coding which environment or network the application will be running in and which authentication mechanisms will be used, the developer provides for possible parameters for a variety of different authentication methods. For example, msisdn contains the MSISDN number required for the MSISDN based authentication; kerberos_ticket contains the token required by Kerberos authentication. The weaver implementing authentication in the specific operator network will then only use the parameters that are relevant for the specific authentication. For example, KerberosAuthentication will take two parameters: credential and one time pad, where all other implementations require just one credential parameter.

Obviously different operator networks will have different implementations of the certain aspect, such as the authentication aspect. In the above example, we see above the definitions of three authentication aspects for Liberty-based, Kerberos-based and MSISDN-based authentication. Each such aspect implementation can use its own types of paramaters. Consequently, there is no restriction that all such implementation should have the same type of parameters.

In the above example, the integration description states that the operator uses a LibertyAuthentication. Thus, the Liberty-Authentication aspect will be used during the weaving process. The weaver implementing relaxed parameters will detect, that this aspects requires a parameter of type Liberty-Credential, even though the join point does not provide such a parameter. On the other hand, if the weaver detects that there is a credential parameter of type MSISDN, it may be possible to convert the MSISDN parameter into a LibertyCredential parameter by using a conversion chain (e.g., MSISDN->SSO_Credential->LibertyCredential).

It is also possible to use the idea of relaxed parameters for many (strongly) typed programming language and may be particularly of interest for function invocations and the corresponding semantics. Furthermore, it is possible to extend the idea of "relaxed parameters" to include also the notion of the "relaxed names". Because the exact names of the aspects are not always known in advance, the developer could use the name that he considers to be meaningful. During the weaving process, an AOP system can use "names converters" that are similar to "type converters" to find the appropriate aspect.

Related Control Comments:

In certain embodiments, the generic control indicators may be thought of as sets of related control comments. In order to implement this embodiment, extensions to AOP systems may be required. On the aspect definition side, a new structure or definition is proposed which will be called "sub-aspects." Sub-aspects may be similar to definitions of functions inside a class when using object orientated program languages. Sub-aspects are used and defined within the context of the main aspect. Similar to object orientated programming, sub-aspects or "related" aspects share the information between them. In particular the sharing of information can be used to pass the results generated by some of the sub-aspects as parameters to other sub-aspects of the same main aspect.

At the application side, control indicators or comments (e.g. join point definitions) may be used and should contain name of the aspect and the name of the sub-aspect implementing the logical step inside the business logic. In certain embodiments, from the perspective of the client, the usage of sub-aspects is similar to usage of aspects. However, the name of the referred aspect now contains the name of the main aspect and of the sub-aspect. Thus, there is a logical grouping of the sub-aspects.

In certain embodiments, the sub-aspects can explicitly access data created or modified by another sub-aspect of the same parent aspect. In other words, they share some common data. Thus, the use of sub-aspects introduce a concept of the "related" aspects or family of aspects which have some knowledge about each other.

For example consider the following code illustrating a syntax for an aspect definition:

```
aspect AuthenticationAspect
{
   //user_credential is a shared information
   // between all sub-aspects
      Credential user_credential;
   // Definition of three sub-aspects
      aspect Login (String user_name) -> Credential { }
         aspect Authorize { }
         aspect Logout { }
}
```

The application using this aspect, might have code similar to:

```
/**
    @Authentication.Login
    {    user_name="John.Carry",    liberty_name="JohnnyX",
kerberos_name="JohnAdmin"}
*/
...
/**
    @Authentication.Authorize
    { Action = "ReadAccounts"}
*/
...
/**
@Authentication.Logout
*/
```

The above example defines a main aspect called Authentication. This main aspect contains three sub-aspects called: Login, Authorize and Logout. These sub-aspects represent three steps in the process of authentication. However, all three sub-aspects share the variable user_credential that keeps the user credential. The client application then refers to such sub-aspects using the name of the name aspect and the name of the sub-aspect. At the first step of business logic, the login sub-aspect is applied. This sub-aspect will login into the system and obtain a temporary credential, which may be used for subsequent operations/steps inside this session. At the next step, the Authorize sub-aspect is applied, which performs authorization routines for a given action for the user authentication in the previous step. In the code above, note that there is no need for the application programmer to provide explicitly the credential obtained in the previous as an input parameter for this step. In fact, the programmer may not know, that the previous step produced a credential because the credential from the first step is basically "saved" in the data associated with the application of the authentication aspect. However, all sub-aspects can access and modify the credential. Note that the logout step also does not explicitly take a credential argument, because that process can also access the shared user_credential element of the aspect AuthenticationAspect).

In other words, for each such set of related control comments referring to the set of sub-aspects, the AOP engine/weaver may during the application/weaving of the parent aspect at these places attach the storage for all the shared attributes of the parent aspect (e.g. user_credential in the above example). All sub-aspects can then access and modify this data during their execution.

On the other hand, if there is no integration description in any form for the parent aspect, which implies that an operator/service provider does not want to support a given business logic (e.g. a given type of authentication, a given type of charging, like pre-paid or post-paid, etc), then the references to the sub-aspects may be ignored as well.

Thus sub-aspects provides a construct to group logically related aspects together.

Configuration File:

In some embodiments, the generic control indicators could simply be pointers to configuration files. The configuration files may contain descriptions or instructions which may then be read and used during weaving. Such a description in AOP may contain the information, which defined at what places and at what time, a third-party application should be instrumented by inserting the aspect code (or when and how some actions should be triggered by the control comments inside the application). In some embodiments, the description of places is not performed on the micro-level (source code line numbers), but by providing high-level descriptions. For example "all classes whose name starts with Billing should be instrumented" or "all places before a call of a given function", "all places containing a following control commentary", etc. The descriptions may also reference control commands or commentaries and integration descriptions.

The AOP configuration files are not necessarily created by the operator (who may be defining the aspects). Thus, in some situations the application provider (owning the application server where the applications are deployed) defines these descriptions when deploying an application.

One advantage is that the same application code can be targeted for different operators by means of providing different integration descriptions and different aspects implementations. Furthermore, an application can be targeted for an operator platform that did not exist at the moment of the development of that application. It is also possible to add new functionalities (which are rather orthogonal to the kernel functionalities of the application) to an application during the deployment time or run-time.

Alternative Embodiments:

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

It is also possible to use the embodiments described above to non-telecom applications. The method disclosed herein may be extended for usage in any situation, where there is a set of servers/networks or run-time environments/platforms that are rather similar from the high-level point of view, but still have their specific interfaces for the similar functionalities. In these cases, the similar functionalities are very good candidates to become aspects in the same sense, as it was discussed above. Of course, to achieve that one will need to introduce some sort of special domain-specific control commentaries to be used for aspects and application programs.

Adaptation of the applications running on the mobile phones to a concrete target model of the mobile phone can be done in a similar way. The application would use control commentaries at the places, where it wants to call a "common functionality" from the phone (e.g. establish a call, get an address from the address book, etc). When a mobile phone owner wants to install such an application on the phone, the download server (where this application will be downloaded from) could implement the adaptation of the application similar to the deployment on the application servers.

Any advantages and benefits described may not apply to all embodiments of the invention. When the word "means" is recited in a claim element, Applicant intends for the claim element to fall under 35 USC 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC 112, paragraph 6.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

What is claimed is:

1. An engine for transforming generic software code into operator-specific software code, the engine comprising:
   a processor;
   a memory in communication with the processor, the memory containing instructions for causing the processor to control the following modules when the instructions are run on the processor:
   a module for reading binary generic software code, wherein the binary generic software code includes at least one generic control indication explicitly present in the code, wherein the generic control indication includes at least one aspect corresponding to operator specific requirements;
   a processing module including:
      a module for detecting at run-time, the at least one generic control indication from the binary generic software code;
      a module for determining a reference to the at least one aspect from the generic control indication, wherein the at least one aspect corresponds to operator specific requirements;
      a module for determining an integration instruction; and
      a module for inserting an implementation of the at least one aspect according to the integration instruction and according to the generic control indication; and
   a module for providing binary operator-specific software code at run-time such that the operator-specific software code can be accessed for execution;
   wherein the generic control indication contains a relaxed parameter, wherein the relaxed parameter is processed by:
      determining a referenced aspect implementation from an aspect invocation;
      determining a set of required target parameters;
      reading a plurality of source parameters;
      determining from the aspect invocation for each required target parameter a set of related provided source parameters;
      selecting for each target parameter one of the related source parameters from the set of related source parameters, such that a type of the target parameter and a type of the selected source parameter are equal; and
      determining whether any of the source parameters from the set of related parameters matches the type of the target parameter, if no, then converting at least one of the related source parameters to the type of the required target parameter.

2. The engine of claim 1, wherein the generic control indication is a control comment.

3. The engine of claim 1, wherein the module for providing the binary operator-specific software code is selected from the group consisting of:
   a data storage from which the operator-specific software code may be downloaded for execution;
   an output unit adapted to transfer the operator-specific software code to a data carrier; and
   a transmission unit adapted to send the operator-specific software code to an execution unit.

4. The engine of claim 1, further comprising a database including aspect implementations for multiple operators.

5. The engine of claim 1, wherein the engine is based on an Aspect Orientated Program ("AOP") engine.

6. The engine of claim 1, where the generic control indication is at a join point.

7. The engine of claim 1, further comprising a database including integration instructions for multiple operators.

8. A computer-controlled method for transforming generic software code into operator-specific software code, the method comprising:
   reading binary generic software code at run-time by a first module controlled by a processor, wherein the binary generic software code includes at least one generic control indication explicitly present in the code, wherein the generic control indication includes at least one aspect corresponding to operator specific requirements;
   detecting by a second module controlled by the processor, the at least one generic control indication from the binary generic software code;
   determining by a third module controlled by the processor, the at least one aspect from the generic control indication, wherein the at least one aspect corresponds to operator specific requirements;
   determining an integration instruction by a fourth module controlled by the processor;
   inserting by a fifth module controlled by the processor, an implementation of the at least one aspect according to the integration instruction and according to the generic control indication; and
   generating by a sixth module controlled by the processor, binary operator-specific software code which includes the at least one aspect;
   wherein the generic control indication contains a relaxed parameter, wherein the relaxed parameter is processed by:
      determining a referenced aspect implementation from an aspect invocation;
      determining a set of required target parameters;
      reading a plurality of source parameters;
      determining from the aspect invocation for each required target parameter a set of related provided source parameters;
      selecting for each target parameter one of the related source parameters from the set of related source parameters, such that a type of the target parameter and a type of the selected source parameter are equal; and determining whether any of the source parameters from the set of related parameters matches the type of the target parameter, if no, then converting at least one of the related source parameters to the type of the required target parameter.

9. The method of claim 8 further comprising providing the operator-specific software code such that the operator-specific software code can be accessed for execution.

10. The method of claim 8, wherein the generic control indication is a control comment.

11. The method of claim 8, further comprising:
determining a sub-aspect relating to the aspect; and
using the sub-aspect to perform additional processes, wherein the additional processes are based on predetermined characteristics of the sub-aspect.

12. A computer-controlled method for utilizing relaxed parameters to interpret source type parameters used in an aspect invocation, the method comprising:
determining at run-time by a first module controlled by a processor, a referenced aspect implementation from an aspect invocation at a binary code level;
determining by a second module controlled by the processor, a set of required target parameters;
reading by a third module controlled by the processor, a plurality of source parameters at the binary code level;
selecting by a fourth module controlled by the processor, a set of related source parameters for each target parameter;
for each target parameter, selecting by a fifth module controlled by the processor, one of the related source parameters from the set of related source parameters, such that a type of the target parameter and a type of the selected source parameter are equal;
determining by a sixth module controlled by the processor, whether any of the source parameters from the set of related parameters matches the type of the target parameter;
upon determining that some of the source parameters from the set of related parameters match the type of the target parameter, using the selected set of related source parameters to perform the aspect invocation at the binary code level; and
upon determining that none of the source parameters from the set of related parameters match the type of the target parameter, converting at least one of the related source parameters to the type of the required target parameter.

13. The method of claim 12, further comprising issuing an error message if the subset is not successfully matched.

14. The method of claim 12, wherein the selecting for each target parameter further comprises:
determining if positional parameters are used, and if yes, then:
determining a position of the target parameter; and
defining related source parameters to be the source parameters that are at a same position as a current target parameter;
if positional parameters are not used, then:
determining a name of the current target parameter; and
defining related source parameters to be the relevant source parameters that match the name of the current target parameter.

15. The method of claim 12, wherein selecting one of the related source parameters that matches the type of the required target parameter further comprises:
determining the target parameter type;
determining whether related source parameters contain a value of a target type, and if yes, then setting the source parameter value to be the value corresponding to be the required target parameter during the aspect invocation;
if no, then:
locating a chain of type conversions;
determining if the chain of type conversions was found, if not, then issuing an error message;
converting one of the related source parameters values into a required target parameter type; and
setting the converted source parameter value to be the value corresponding to the required target parameter during the aspect invocation.

* * * * *